United States Patent
Yamamoto et al.

(10) Patent No.: US 7,278,633 B2
(45) Date of Patent: Oct. 9, 2007

(54) HYDRAULIC ANTIVIBRATION DEVICE ARRANGEMENT, HYDRAULIC ANTIVIBRATION DEVICE, AND CAR BODY SIDE BRACKET

(75) Inventors: Hikofumi Yamamoto, Osaka (JP); Yukio Takashima, Osaka (JP)

(73) Assignee: Toyo Tire & Rubber Co., Ltd., Osaka-shi (JP)

( * ) Notice: Subject to any disclaimer, the term of this patent is extended or adjusted under 35 U.S.C. 154(b) by 113 days.

(21) Appl. No.: 10/545,606

(22) PCT Filed: Dec. 24, 2004

(86) PCT No.: PCT/JP2004/019304

§ 371 (c)(1), (2), (4) Date: Aug. 16, 2005

(87) PCT Pub. No.: WO2006/067849

PCT Pub. Date: Jun. 29, 2006

(65) Prior Publication Data

US 2006/0261529 A1    Nov. 23, 2006

(51) Int. Cl.
*F16F 7/00*    (2006.01)
(52) U.S. Cl. ............ 267/140.13; 267/141.3
(58) Field of Classification Search ......... 267/140.13, 267/141.3
See application file for complete search history.

(56) References Cited

U.S. PATENT DOCUMENTS

| | | | |
|---|---|---|---|
| 5,178,374 A * | 1/1993 | Maeno | 267/140.13 |
| 5,628,498 A * | 5/1997 | Nanno | 267/140.13 |
| 5,636,826 A * | 6/1997 | Nakagaki et al. | 248/562 |
| 5,704,598 A * | 1/1998 | Kojima | 267/140.13 |
| 5,961,103 A * | 10/1999 | Reh et al. | 267/140.13 |
| 6,120,011 A * | 9/2000 | Maeno et al. | 267/140.11 |
| 6,131,894 A * | 10/2000 | Satori et al. | 267/140.13 |
| 6,158,724 A * | 12/2000 | Takashima et al. | 267/140.13 |
| 6,257,562 B1* | 7/2001 | Takashima et al. | 267/141.1 |
| 6,425,575 B1* | 7/2002 | Takashima et al. | 267/140.13 |
| 6,439,554 B1* | 8/2002 | Takashima et al. | 267/140.13 |

(Continued)

FOREIGN PATENT DOCUMENTS

EP    1336771 A2 *   8/2003

(Continued)

*Primary Examiner*—Robert A. Siconolfi
(74) *Attorney, Agent, or Firm*—Westerman, Hattori, Daniels & Adrian, LLP.

(57) ABSTRACT

A hydraulic antivibration device arrangement capable of achieving a downsizing and weight reduction, and a reduction of booming noise by suppressing a reaction force to impingement upon stopper action is provided. By disposing a protuberant rubber portion 35 at an upper end of a main body member 2, its spacing distance from a roll center can be lengthened, the reaction force to impingement can be diminished, and input load to the main body member 2 can be diminished. Consequently, reduction of rigidity and strength required for respective components as well as enhancement of durability is possible, which permits to make the components thin-walled thereby making a hydraulic antivibration device arrangement 100 lightweight as a whole. Diminishing of such reaction force upon stopper action also enables vibrations input through a car body side bracket 120 to the body frame to be suppressed, thereby reducing the generation of booming noise.

8 Claims, 8 Drawing Sheets

U.S. PATENT DOCUMENTS

| | | | |
|---|---|---|---|
| 6,505,822 B1 * | 1/2003 | Yamamoto et al. | 267/140.13 |
| 6,554,263 B2 * | 4/2003 | Takashima et al. | 267/140.13 |
| 6,619,636 B2 * | 9/2003 | Yamamoto et al. | 267/140.13 |
| 6,676,117 B2 * | 1/2004 | Desmoulins et al. | 267/140.13 |
| 6,698,732 B2 * | 3/2004 | Takashima et al. | 267/140.13 |
| 6,793,207 B2 * | 9/2004 | Umemura et al. | 267/140.13 |
| 7,111,705 B2 * | 9/2006 | Ohta et al. | 180/312 |

FOREIGN PATENT DOCUMENTS

| | | |
|---|---|---|
| JP | 60-192141 | 9/1985 |
| JP | 61-133140 | 6/1986 |
| JP | 61228140 A * | 10/1986 |
| JP | 11-153178 | 6/1999 |
| WO | WO02/095259 | 11/2002 |

* cited by examiner

HYDRAULIC ANTIVIBRATION DEVICE ARRANGEMENT, HYDRAULIC ANTIVIBRATION DEVICE, AND CAR BODY SIDE BRACKET

TECHNICAL FIELD

This invention relates to a hydraulic antivibration device arrangement, a hydraulic antivibration device and a car body side bracket, and more particularly, to such hydraulic antivibration device arrangement, hydraulic antivibration device and car body side bracket that are capable of achieving a downsizing and weight reduction and a reduction of booming noise by suppressing a reaction force to impingement upon stopper action.

BACKGROUND ART

As an antivibration device for supporting and fixing a vibration generator such as an automotive engine or transmission so as not to transmit vibrations thereof to a vehicle body frame, hydraulic style antivibration devices are known.

Hydraulic antivibration devices each have a liquid-sealed chamber comparted by partition means into a first and a second liquid chambers, which are put in communication with each other through an orifice, and perform both a vibration attenuating function and a vibration insulating function due to a fluid fluidization effect through the orifice between the first and second liquid chambers and a vibration-deadening effect of a vibration-isolating base.

Of these, there is such a hydraulic antivibration device that the partition means comprises an elastic partition membrane made of rubber-like elastomer material and a pair of displacement-regulating members regulating the displacement amount of the elastic partition membrane from both sides thereof.

According to the hydraulic antivibration device of this type, when a relatively small amplitude vibration is input, the elastic partition membrane is subjected to reciprocating displacement, thereby absorbing a hydraulic pressure fluctuation between both liquid chambers, so that a low dynamic spring characteristic can be obtained. On the other hand, when a relatively large amplitude vibration is input, for example, owing to irregularities of the travelling road surface, the displacement-regulating members serve to regulate the displacement amount of the elastic partition membrane from its both sides to enhance the membrane stiffness, thereby rendering the fluid easy to fluidize between both liquid chambers through the orifice, so that a high damping characteristic can be obtained.

However, a problem with the hydraulic antivibration device of this type was that because of the construction that the elastic partition membrane is made to impinge (abut) on the displacement-regulating members, the displacement-regulating members oscillate upon impinging, which oscillation is transmitted to the body frame to generate a strange sound (noise).

As a technology of suppressing the generation of such strange sounds, for example, WO 02/095259 A1 discloses, in connection with a hydraulic antivibration device constructed so that a vibration-isolating base made of rubber-like elastomer material is interconnected between a boss member and a cylindrical main body member and a liquid-filled chamber is formed between a diaphragm provided at the main body member and a vibration-isolating base, a technology for connecting the boss member to a body frame side while connecting the main body member to an engine side (Patent Reference 1).

According to this technology, it is possible to construct a part of a vibration transmission path from partition means (the elastic partition membrane and the displacement-regulating members) to the vehicle body frame by the vibration-isolating base, and consequently, even if the elastic partition membrane impinges on the displacement-regulating members, which in turn oscillate, it is possible to suppress transmission of the oscillation to the body frame by virtue of the vibration insulating effect of the vibration-isolating base constituting a part of the vibration transmission path, thus reducing the generation of strange noises.

[Patent Reference 1] WO 02/095259A1 (FIGS. 1, 2, etc.)

DISCLOSURE OF THE INVENTION

Problems to be Solved by the Invention

In the above-mentioned hydraulic antivibration device as shown in FIG. 1 of Patent Reference 1, the car body side bracket is configured in a frame form and its internal face is configured as a stopper surface. That is, at the external face of the main body member, a rubber stopper member is provided to abut on the internal face of the car body side bracket so that an excessive displacement of the hydraulic antivibration device can be regulated.

However, the aforesaid hydraulic antivibration device was constructed so that the rubber stopper member is formed in such a longitudinally elongated shape extending along the height direction of the main body member that for example, against the displacement in a roll motion direction, the overall rubber stopper member is brought into plane abutment on the internal face of the car body side bracket at one time. Therefore the problem here was that upon stopper action to the roll motion direction, a reaction force to impingement is so large that input loads to the main body member and the car body side bracket become large.

As a result, there were further problems that the necessity of making the respective elements thick-walled to ensure their rigidity and strength is created, causing a weight increase and the oscillation ascribed to the impingement is transmitted to the body frame to generate booming noise. Further, in order to ensure the stroke amount in the roll motion direction, it is necessary to enlarge the distance between opposed internal faces of the car body side bracket, which fact further ran into the problem that the device as a whole is made large-sized.

In view of the problems described above, this invention has been made, and it is an object of the present invention is to provide a hydraulic antivibration device arrangement, a hydraulic antivibration device and a car body side bracket that are capable of achieving a miniaturization and weight reduction of respective constituent elements and a reduction of booming noise by suppressing input load upon stopper action.

Solution Means of the Problems

In order to attain this object, the hydraulic antivibration device arrangement as set forth in a first aspect of the invention comprises:

a hydraulic antivibration device which comprises a cylindrical main body member, a boss member positioned on a lower end face side of the main body member, a vibration-isolating base made of rubber-like elastomer material connecting the boss member and the main body member, a diaphragm attached to the main body member to define a liquid-filled chamber between the diaphragm and the vibration-isolating base, partition means comparting the liquid-filled chamber into a first liquid chamber on the vibration-isolating base side and a second liquid chamber on the diaphragm side, an orifice putting the first liquid chamber and the second liquid chamber into communication with each other, and a rubber stopper member made of rubber-like elastomer material provided on an outer surface of the main body member;

an engine side bracket formed integrally with the main body member of the hydraulic antivibration device and to be coupled to the engine side; and a car body side bracket that includes a bottom face part to which the boss member of the hydraulic antivibration device is locked and fixed, a pair of sidewall parts provided perpendicularly from the bottom face part and opposed to each other, interposing the hydraulic antivibration device therebetween, and a top face part interconnecting the pair of the sidewall parts and opposed to the bottom face part, interposing the hydraulic antivibration device between the bottom face part and the top face part, and is adapted to be connected to a body frame side;

and is constructed to support the engine in a suspending manner and to be capable of bringing the rubber stopper member provided on the outer surface of the main body member into abutment on internal faces of the sidewall parts of the car body side bracket, thereby regulating displacement of the engine in a roll motion direction at least upon acceleration, which arrangement is characterized in that the rubber stopper member is provided with a protuberant rubber portion protruding from the outer surface of the main body member toward the sidewall parts of the car body side bracket and tapering in cross-section, and the protuberant rubber portion is situated at least on the upper end side above a vertically intermediate position of the main body member and configured in a transversely elongated body extending straight widthwise toward the sidewall parts of the car body side bracket while facing the sidewall parts in a spaced relation of a definite distance;

and that the sidewall parts of the car body side bracket each includes an abutment sidewall portion having an abutment face on which the protuberant rubber portion of the rubber stopper member abuts and a thick-walled sidewall portion formed to be more thick-walled than the abutment sidewall portion, and the abutment face of the abutment sidewall portion is formed to be depressed from the inner face of the thick-walled sidewall portion toward receding from the outer surface of the main body member.

The hydraulic antivibration device arrangement of a second aspect of the invention relates to the hydraulic antivibration device arrangement and is characterized in that the main body member is provided with a projecting main body portion projecting from the outer surface of the main body member toward the sidewall parts of the car body side bracket, and the projecting main body portion is situated on the upper end side above the vertically intermediate position of the main body member, and configured in the transversely elongated body extending straight widthwise toward the sidewall parts while facing the sidewall parts of the car body side bracket to be spaced apart a definite distance and encased in the protuberant rubber portion of the rubber stopper member.

The hydraulic antivibration device arrangement of a third aspect of the invention relates to the hydraulic antivibration device arrangement, and is characterized in that the main body member is provided with a cutout portion (undercut) defined by cutting a part of an underside thereof situated on the opposite side to the engine side bracket and on the boss member side.

The hydraulic antivibration device arrangement of a fourth aspect of the invention is concerned with the hydraulic antivibration device arrangement, and characterized in that the main body member is provided with a thin-walled portion formed by depressing the outer surface thereof opposite to the engine side bracket.

The hydraulic antivibration device arrangement of a fifth aspect of the invention is concerned with the hydraulic antivibration device arrangement, and characterized in that there are provided a protruding pin projecting from one of the bottom face part of the car body side bracket and the boss member and a slit portion serving as a guide path for the protruding pin and extending at the other of the bottom face part of the car body side bracket and the boss member, and the slit portion has an abutment portion provided at its extending extremity, and that the bottom face part of the car body side bracket has a through-hole for a bolt and the boss member has a locking hole for the bolt so that when the protruding pin is made to abut on the abutment portion of the slit portion, the through-hole and the locking hole for the bolt may be put in communication with each other.

The hydraulic antivibration device arrangement of a sixth aspect of the invention is concerned with the hydraulic antivibration device arrangement, and characterized in that two pieces of the protruding pins are provided projectingly at one of the bottom face part of the car body side bracket and the boss member, and two pieces of the slit portions are provided to extend at the other of the bottom face part of the car body side bracket and the boss member, and that the two protruding pins and the two slit portions are constructed so that when the two protruding pins are made to abut on the abutment portions of the two slit portions respectively, the through-hole and the locking hole for the bolt may be put into communication with each other.

The hydraulic antivibration device arrangement of a seventh aspect of the invention is concerned with the hydraulic antivibration device arrangement, and characterized in that the rubber stopper member includes a rebound side rubber portion and a bound side rubber portion provided respectively on an upper end surface and a lower end surface of the main body member, and the rebound side rubber portion and the bound side rubber portion are constructed so as to be capable of regulating the displacement in a rebound direction and a bound direction of the hydraulic antivibration device by abutment of them on the top face part and the bottom face part of the car body side bracket, respectively.

The hydraulic antivibration device arrangement of an eighth aspect of the invention relates to the hydraulic antivibration device arrangement, and is characterized in that the projecting main body portion of the main body member projecting from the outer surface thereof is situated on an uppermost end side of the main body member and constructed so that upper end surfaces of the projecting main body portion and the main body member are flush with each other.

The hydraulic antivibration device of a ninth aspect of the invention is used for the hydraulic antivibration device arrangement.

The car body side bracket of a tenth aspect of the invention is used for the hydraulic antivibration device arrangement.

EFFECTS OF THE INVENTION

According to the hydraulic antivibration device arrangement of a first aspect of the invention because the protuberant rubber portion is provided above the vertically intermediate position of the main body member, when the protuberant rubber portion is made to abut on the sidewall parts of the car body side bracket, thereby regulating the displacement of the hydraulic antivibration device, the effect accrues that it is possible to make the input loads to the main body member and to the car body side bracket small.

More specifically, where the engine is displaced in the roll motion direction, at the hydraulic antivibration device, the upper end side of the main body member is oscillated like a pendulum relative to the boss member as a fixed point toward the sidewall parts of the car body side bracket. At that time, because of the feature that the protuberant rubber portion of the main body member is situated on the upper end side higher than the vertically intermediate position of the main body member, the distance in which the protuberant rubber portion is spaced apart from the roll center of the engine can be made longer by that amount. If so, inasmuch as a roll moment is determined by the product of a distance and a force, it is possible to make a reaction force to impingement of the protuberant rubber portion smaller and consequently, it is possible to make input loads to the main body member and the car body side bracket small by that amount.

As a result of that, it is possible not only to enhance the durability, but also to lower stiffness and strength required for respective constituent elements, and consequently, the effect accrues that it is possible to make them thin-walled by that amount, thus making the overall arrangement lightweight. Further if the reaction force to impingement upon action of the rubber stopper member can be diminished as mentioned above, it is possible to suppress the vibrations input through the car body side bracket to the body frame and hence, the effect accrues that it is possible to reduce the generation of booming noise by that amount.

Further because of such configuration of the protuberant rubber portion that assumes a transversely elongated shape extending straight in the width direction of the sidewall parts of the car body side bracket while facing the sidewall parts in a spaced relation of a definite distance, the effect accrues that it is possible to secure simultaneously its pressure-receiving area and the distance spacing apart from the roll motion center.

As a consequence, due to enlargement of the pressure-receiving area, a dispersion effect of the input load can be obtained, so that it is possible to enhance the durability. On the other hand, due to the securement of the spacing distance, it is possible to make the input loads to the main body member and to the car body side small thereby achieving a weight reduction and a reduction of booming noise simultaneously.

The car body side bracket includes the sidewall parts each of which consists of an abutment sidewall portion having an abutment face, on which the protuberant rubber portion of the rubber stopper member abuts, and a thick-walled sidewall portion formed to be more thick-walled than the abutment sidewall portion, wherein the abutment face of the abutment sidewall portion is depressed from the inner face of the thick-walled sidewall portion toward receding from the outer surface of the main body member.

Thus due to the depressed formation, it becomes possible to make the abutment face of the abutment sidewall portion to be spaced apart from the protuberant rubber portion of the rubber stopper member. Therefore the effect accrues that it is possible to secure the stroke amount in the roll motion direction without the necessity of making the car body side bracket itself large-sized as is the case with existing products. Further effect obtainable is that due to the depressed amount of the sidewall portions, it is possible to enhance the durability of the overall car body side bracket by the constitution of the thick-walled sidewall portions, while attaining a weight reduction of the overall car body side bracket.

Here, such depressed provision of the abutment faces like this (namely, making the abutment sidewall portions thin-walled) is usually impossible, inasmuch as such abutment face is subject to input load from the protuberant rubber portion, but has become possible for the first time in this invention by constructing the car body side bracket in the form of a frame consisting of the bottom face part, the sidewall parts and the top face part and further providing the thick-walled sidewall portion thicker than the abutment sidewall portion to dispose it at the location where the abutment sidewall portion is interposed between the thick-walled sidewall portion and the top face part, whereby weight reduction and securement of the strength can be simultaneously achieved.

According to the hydraulic antivibration device arrangement as claimed in claim 2, an additional effect to the effects achieved by the hydraulic antivibration device arrangement as claimed in claim 1 is achieved in that because the main body projecting portion is provided in the position where it is encased in the protuberant rubber portion, namely, on the upper end side above the vertically intermediate position of the main body member, it is possible to elevate the rigidity and strength of the main body member while suppressing an weight increase of the main body member, thereby enhancing its durability.

That is, according to the invention, because the protuberant rubber portion (the position where a load is input) is made eccentric on the upper end side of the main body member, it is unnecessary to reinforce the vertical entirety of the main body member as is the case with conventional products, but it suffices to reinforce only the upper end side by the projecting main body portion, or in other words it is possible to make the lower end side of the main body member more thin-walled, and hence it is possible to attain a weight reduction of the hydraulic antivibration device arrangement as a whole, by that amount.

In addition, because the projecting main body portion is configured in a transversely elongated body extending straight in the width direction of the sidewall parts of the car body side bracket while facing the sidewall parts at a definite distance, the effect accrues that it is possible simultaneously to ensure the pressure-receiving area and to ensure the spacing distance from the roll motion center.

As a consequence, due to the extended pressure-receiving area, it is possible to obtain an input load dispersion effect and hence, the durability can be enhanced, while due to the securement of the spacing distance of the projecting main body portion formed in a transversely elongated shape from the roll motion center, it is possible to make the input loads to the main body member and the car body side bracket small as described above, so that a weight reduction and a reduction of booming noise can be achieved simultaneously.

According to the hydraulic antivibration device arrangement of a third aspect of the invention, further effect is achieved in that because the main body member has the cutout portion formed by cutting out a part of the main body member, it is possible to make the main body member more lightweight, thereby achieving a weight reduction by that amount of the hydraulic antivibration device arrangement as a whole.

In this invention, because of the constitution that the main body member supports the engine in a cantilever manner relative to the boss member as a fixed point, if the top end side of the main body member (namely, opposite side to the engine connecting side) becomes heavier, a resonance point of the main body member thereto will shift to a low frequency range (e.g., 500~600 Hz and its vicinity), which leads to the problem that a so-called high speed booming noise is generated. Contrary to this, here, the position of the cutout portion is situated on the opposite side to the engine (engine side bracket) while interposing the boss member and consequently, it is possible to render the top end side of the main body member lightweight. As a result, the effect accrues that it is possible to shift efficiently the resonance point of the main body member toward a high frequency range to suppress securely any adverse effect upon dynamic characteristics of the hydraulic antivibration device arrangement.

Further in this invention, the main body member is provided, on the upper end side, with a groove or slot, whose sidewall portion is bent toward the inner periphery of the main body member so that it can caulk and fix the diaphragm and others. Here, since the cutout portion is situated on the lower end side of the main body member, there is the effect that it is possible to avoid a reduction of the space for the formation of the groove by the cutout portion. As a result, it is possible to fix firmly the diaphragm and so forth.

As described above, the position of the cutout portion is situated on the top end side of the main body member and thus not a location where it abuts on the bottom face part of the car body side bracket. Therefore the effect accrues that even where the main body member is provided on its lower end side with the bound side rubber portion so as to be capable of exhibiting a stopper action of the bound side, it is possible to achieve a weight reduction while suppressing the reduction of durability of the main body member due to the formation of the cutout portion to the minimum limit.

According to the hydraulic antivibration device arrangement of a fourth aspect of the invention, the effect accrue main body member is provided with a thin-walled portion formed by depressing a part of the outer surface thereof, it is possible to make the main body member more lightweight, achieving a weight reduction of the hydraulic antivibration device arrangement as a whole by that amount.

Here, since the position of the thin-walled portion is situated on the opposite side to the engine (engine side bracket) while interposing the boss member, it is possible to make the top end side of the main body member lightweight. As a result, further effect accrues that it is possible to shift efficiently the resonance point of the main body member toward high frequency range as stated above, thereby suppressing reliably any adverse effect upon dynamic characteristics of the hydraulic antivibration device.

Again in this invention, the rubber membrane is formed on the inner periphery side of the main body member, and the partition means and the diaphragm are inserted while faying with the rubber membrane. At that time, since the position of the thin-walled portion is situated on the outer surface of the main body member, due to the fact that the thin-walled portion is partly formed, the effect is yielded that it is possible to avoid that the membrane thickness of the rubber membrane becomes uneven in the circumferential direction. As a consequence, it is possible to fay evenly full outer peripheries of the partition means and the diaphragm with the rubber membrane, so that it is possible to prevent leak of liquid to suppress a reduction of the dynamic characteristics.

According to the hydraulic antivibration device arrangement of a firth aspect of the invention, the following the protruding pin is provided projectingly from one of the bottom face part of the car body side bracket and the boss member, and in order to form a guide path for the protruding pin, the slit portion is provided on the other of the bottom face part of the car body side bracket and the boss member.

Because of that, even though a distance between opposed faces of the bottom face part and the top face part of the car body side bracket configured in the form of a frame is narrower than the height dimension of the hydraulic antivibration device, it is possible to receive the protruding pin in the slit portion, thereby extending the distance between the opposed faces in comparison with the height dimension. As a result, when inserting the hydraulic antivibration device into the frame of the car body side bracket, its inserting operation can be readily conducted, whereby the working efficiency can be enhanced. It is also possible to construct the distance between the opposed faces narrower, which yields the effect that by that amount, it is possible to downsize the overall hydraulic antivibration device arrangement.

In the operation of inserting the hydraulic antivibration device into the frame of the car body side bracket, because the slit portion serves as a guide path for the protruding pin, the effect accrues that the insertion operation efficiency can be enhanced. In addition, the through-hole for bolt at the bottom face part and the bolt locking hole of the boss member can be readily put into communication with each other by moving the protruding pin up to the terminal end of the guide path to make it to abut on the abutment face. Therefore the effect accrues that it is possible to lock so readily the bolt to the bolt locking hole that the locking operation efficiency can be enhanced.

Further the slit portion suffices to have an equal level of width to that of the protruding pin, and consequently, it is possible to suppress the machining amount to the bottom face part of the car body side bracket to the minimum limit and its machining operation is also easy. That is, since there is no need to conduct a complex machining to the bottom face part of the car body side bracket in an extensive area as in conventional products, the effect accrues that it is possible to suppress an increase in machining cost and a reduction in strength due to the provision of the slit portions.

According to the hydraulic antivibration device arrangement of a sixth aspect of the invention, there exists the effect that because end the slit portion are formed in respective two pieces and constructed so that when each of the protruding pins is brought into abutment on the abutment portion of each of the slit portions, the bolt through-hole and the bolt locking hole may be put into communication with each other, it is possible to conduct positioning, without rotation, of the hydraulic antivibration device (the boss member) to the car body side bracket (the bottom face part). As a consequence, in locking operation of both members, as a further effect, it is possible to put the bolt through-hole and the bolt locking hole into communication with each other easily and securely, and hence, the working efficiency of the locking operation can be enhanced vastly.

According to the hydraulic antivibration device arrangement of a seventh aspect of the invention the effect a the rubber stopper member includes the rebound side rubber portion and the bound side rubber portion on the upper end face and the lower end face of the main body member, respectively, it is possible to regulate securely displacements to the rebound direction and the bound direction.

That is, with conventional products, because the rebound side and the bound side rubber portions were provided on the outer surface of the main body member, there were problems that upon inputting of a large displacement, these rubber portions deform excessively, causing cracking or failure and that the main body member impinges on the top face part and the bottom face part of the car body side bracket, generating a strange noise, but this invention permits to solve these problems by the provision of them on the upper and lower end faces of the main body member.

According to the hydraulic antivibration device arrangement of an eighth aspect of the invention, the effect accrues: the projecting provided projectingly from the outer surface of the main body member is situated on the uppermost end side of the main body member, and the upper end faces of the projecting main body portion and the main body member are constructed to be flush with each other; therefore even in the case where the groove for caulking and fixing is defined on the upper end surface of the main body member, a space for disposing the rebound side rubber portion can be sufficiently ensured. That is, it is possible to achieve a reinforcing effect to the stopper action by the protuberant rubber portion to the roll direction and simultaneously the securement of the disposition space mentioned above and a reinforcing effect to the stopper action to the rebound direction.

According to the hydraulic antivibration device of a ninth aspect of the invention, it is possible to achieve similar effects to those of the hydraulic antivibration device used for the hydraulic antivibration device arrangement.

According to the car body side bracket of a tenth aspect of the invention, it is possible to achieve similar effects to those of the car body side bracket used for the hydraulic antivibration device arrangement.

DESCRIPTION OF REFERENCE CHARACTERS

| 100, 200 | hydraulic antivibration device arrangement |
|---|---|
| 110, 210 | hydraulic antivibration device |
| 1 | boss member |
| 11 | bolt locking hole |
| 12, 212 | protruding pin |
| 2 | main body member |
| 2a | projecting main body portion |
| 2d | cutout portion |
| 2e | thin-walled portion |
| 3 | vibration-isolating base |
| 33 | rubber stopper member |
| 34 | rebound side rubber portion |
| 35 | protuberant rubber portion |
| 36 | bound side rubber portion |
| 5 | diaphragm |
| 6 | liquid-filled chamber |
| 6A | first liquid chamber |
| 6B | second liquid chamber |
| 7 | partition means |
| 71 | orifice |
| 120, 220 | car body side bracket |
| 122 | bottom face part |
| 122a | through-hole for bolt |
| 122b, 222b | slit portion |
| 122b1, 222b1 | abutment portion |
| 123 | sidewall part |
| 123a | abutment sidewall portion |
| 123a1 | abutment face |
| 123b | thick-walled sidewall portion |
| 124 | top face part |
| 130 | engine side bracket |
| EG | engine |
| BF | body frame |
| a | roll direction on the acceleration side |
| ○ | central axis |

BEST MODE FOR CARRYING OUT THE INVENTION

Figure 1A:
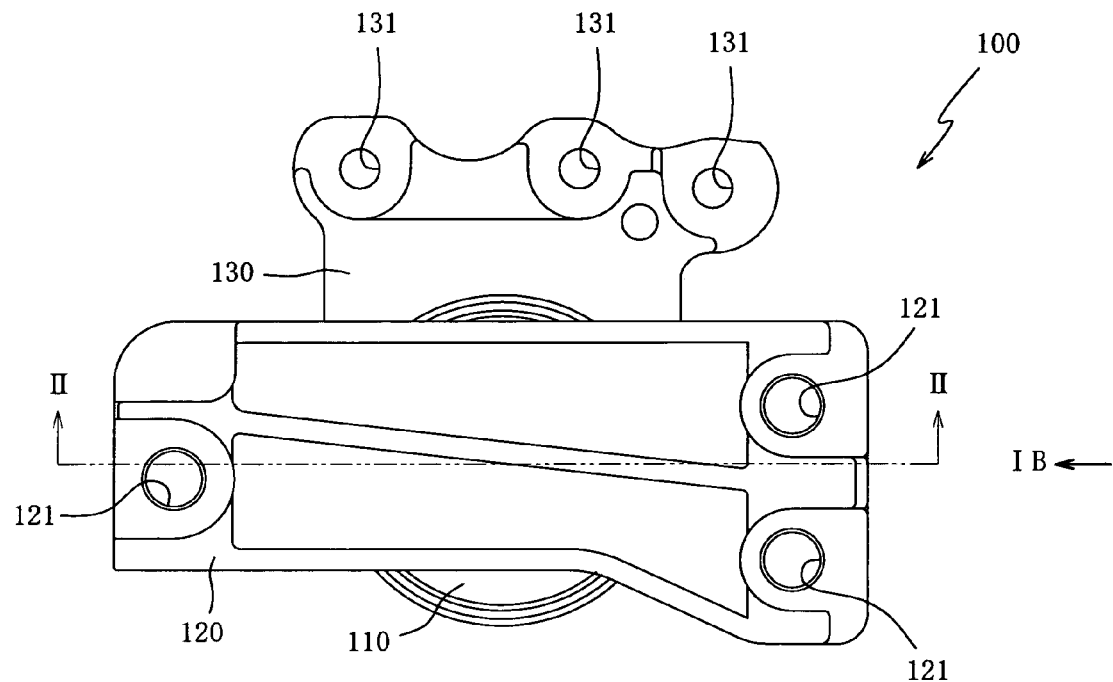
FIG. 1(a) is a top plan view of a hydraulic antivibration device arrangement in a first embodiment of the invention, and (b) is a side elevation of the hydraulic antivibration device arrangement when viewed from the direction of an arrow mark I b in FIG. 1(a).
Figure 1B:
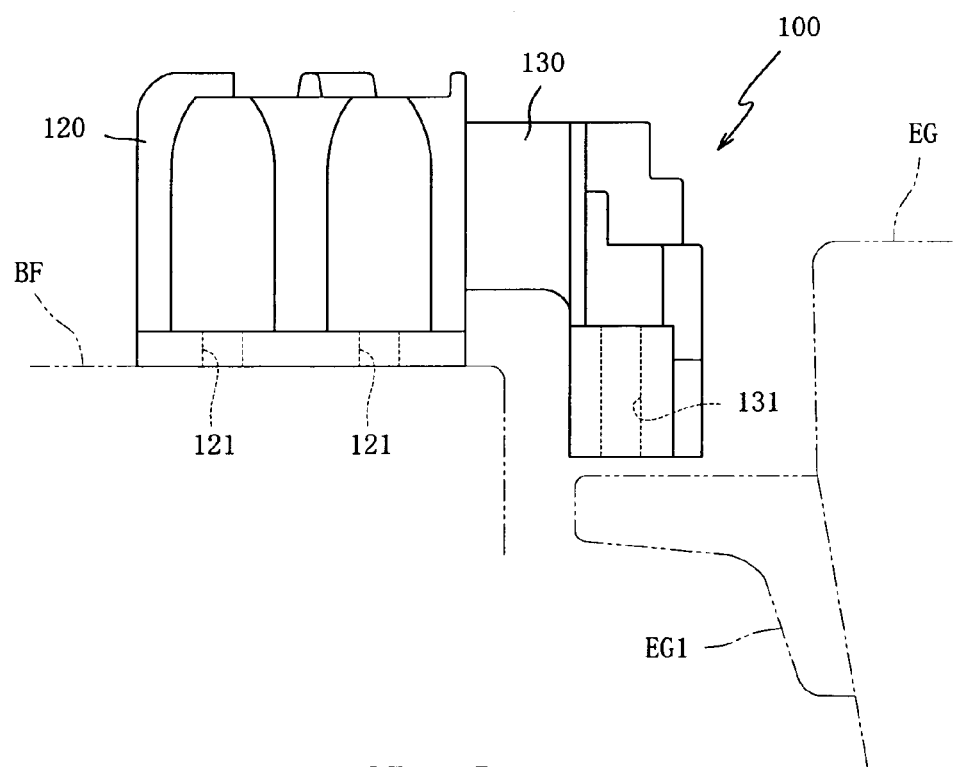

Preferred embodiments of the invention will be hereinafter described with reference to the accompanying drawings. FIG. 1(a) is a top plan view of the hydraulic antivibration device arrangement 100 in a first embodiment, and FIG. 1(b) is a side elevation of the hydraulic antivibration device arrangement 100 when viewed from the arrow mark direction Ib in FIG. 1(a).

The hydraulic antivibration device arrangement 100 is a hydraulic style vibration isolator for supporting the engine EG for automobiles in a cantilever suspended manner so as to prevent vibrations of the engine EG from being transmitted to the body frame BF. As shown in FIG. 1, it is mainly made up of the hydraulic antivibration device 110, the car body side bracket 120 connecting the hydraulic antivibration device 110 to the body frame BF side, and the engine side bracket 130 connecting the hydraulic antivibration device 110 to the engine EG side.

The car body side bracket 120 is adapted to be locked and fixed through three bolts (not shown) each inserted into an attachment hole 121 to the body frame BF while the engine side bracket 130 adapted to be locked and fixed through three bolts (not shown) each inserted through an attachment hole 131 to a coupling member EG1 (to the engine EG).

Figure 2:
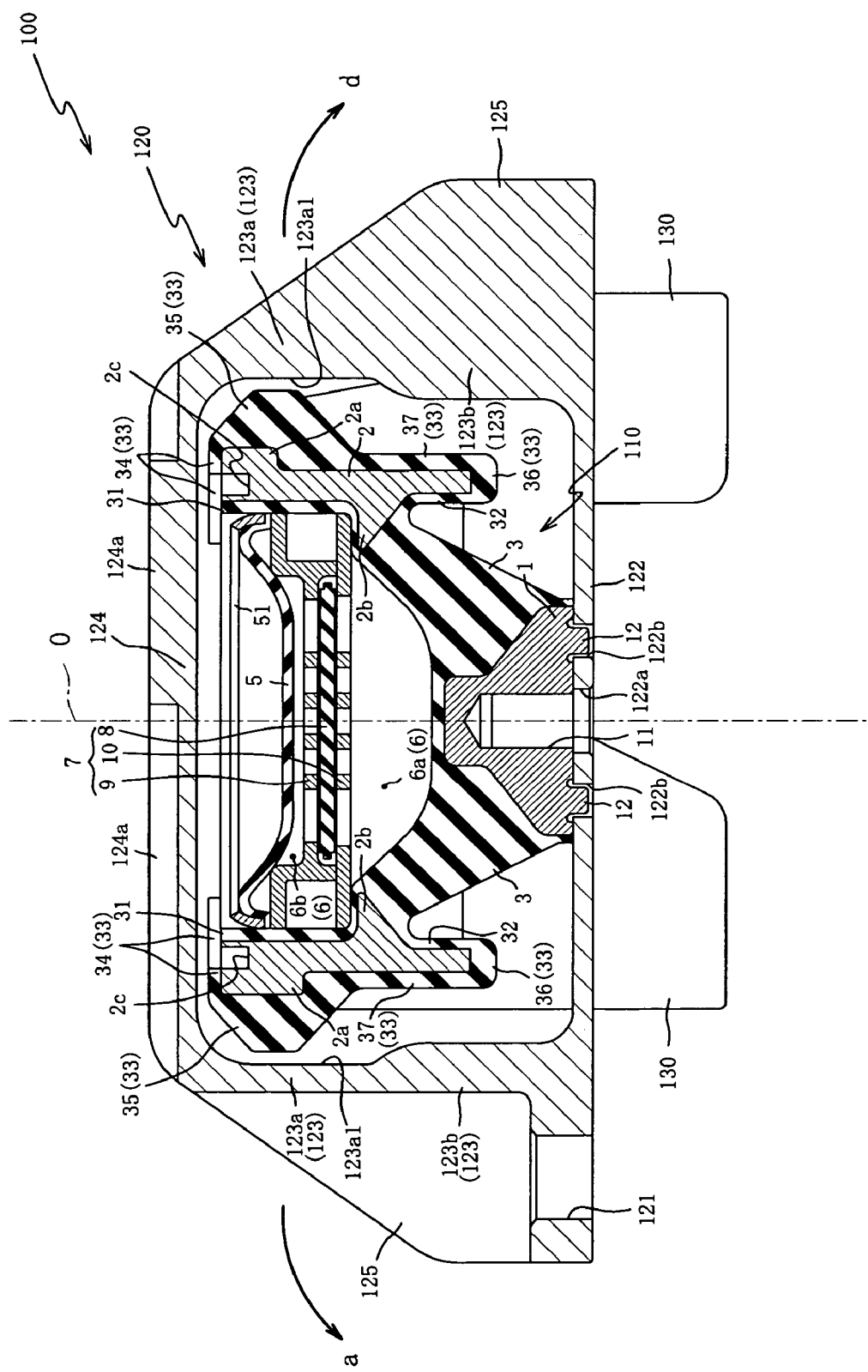
FIG. 2 is a sectional view of the hydraulic antivibration device arrangement taken along II-II line in FIG. 1(a).

At the hydraulic antivibration device 110, the boss member 1 is locked and fixed to the car body side bracket 120 and the main body member 2 is formed integrally with the engine side bracket 130 (cf. FIG. 2). Consequently, a shared load of the engine EG oriented toward the downward direction of FIG. 1(b) acts on the hydraulic antivibration device 110.

FIG. 2 is a cross-sectional view of the hydraulic antivibration device arrangement 100 taken along II-II line of FIG. 1(a). In FIG. 2, the center line indicated in a one dot-dash line indicates the center axis O of the hydraulic antivibration device 110. FIG. 2 shows a sidewall portion of a groove 2c prior to being subjected to bending working.

As shown in FIG. 2, the hydraulic antivibration device 110 is comprised mainly of the boss member 1 to be attached through the car body side bracket 120 to the body frame BF (cf. FIG. 1(b)), the main body member 2 in a cylindrical shape formed integrally with the engine side bracket 130 and to be attached through the engine side bracket 130 to the engine EG side (cf. FIG. 1(b)), and the vibration-isolating base 3 interconnecting both members 1, 2 and made of a rubber-like elastomer material.

The boss member 1 is, as shown in FIG. 2, configured from aluminum alloy or the like in the shape of a generally frustum of a cone in cross-section upwardly converging and symmetric about the central axis O and provided on its lower end face with the bolt locking hole 11 for locking to the car body side bracket 120 which is recessed upwardly. On both sides of the bolt locking hole 11, two protruding pins 12 fitted in the car body side bracket 120 (the slit portions 122b on the bottom face part 122 as described below) are provided to project toward downwardly (the lower side in FIG. 2).

The main body member 2 is configured in a cylinder shape having open upper and lower ends (the upper side and lower side in FIG. 2) from aluminum alloy, etc. The main body member 2 is formed on its outer surface (the deep side from the paper face of FIG. 2) integrally with the engine side bracket 130.

Again the main body member 2 includes the projecting main body portion 2a in a generally rectangular shape in cross-section that is provided projectingly from the outer surface toward the sidewall parts 123 of the car body side bracket 120, and a receptive surface portion 2b in a generally triangular shape in cross-section that is provided projectingly from the inner peripheral surface toward the central axis O side.

The projecting main body portion 2a is situated at the vertically upper end of the main body member 2 (the up-and-down direction in FIG. 2) and encased in the protuberant rubber portion 33, which will be later described. The receptive surface portion 2b is situated slightly downwards of the vertically intermediate position of the main body member 2, wherein its upside serves as a receiving face for the partition means 7 as described below while its downside serves as a receiving face for the vibration-isolating base 3.

Figure 4:
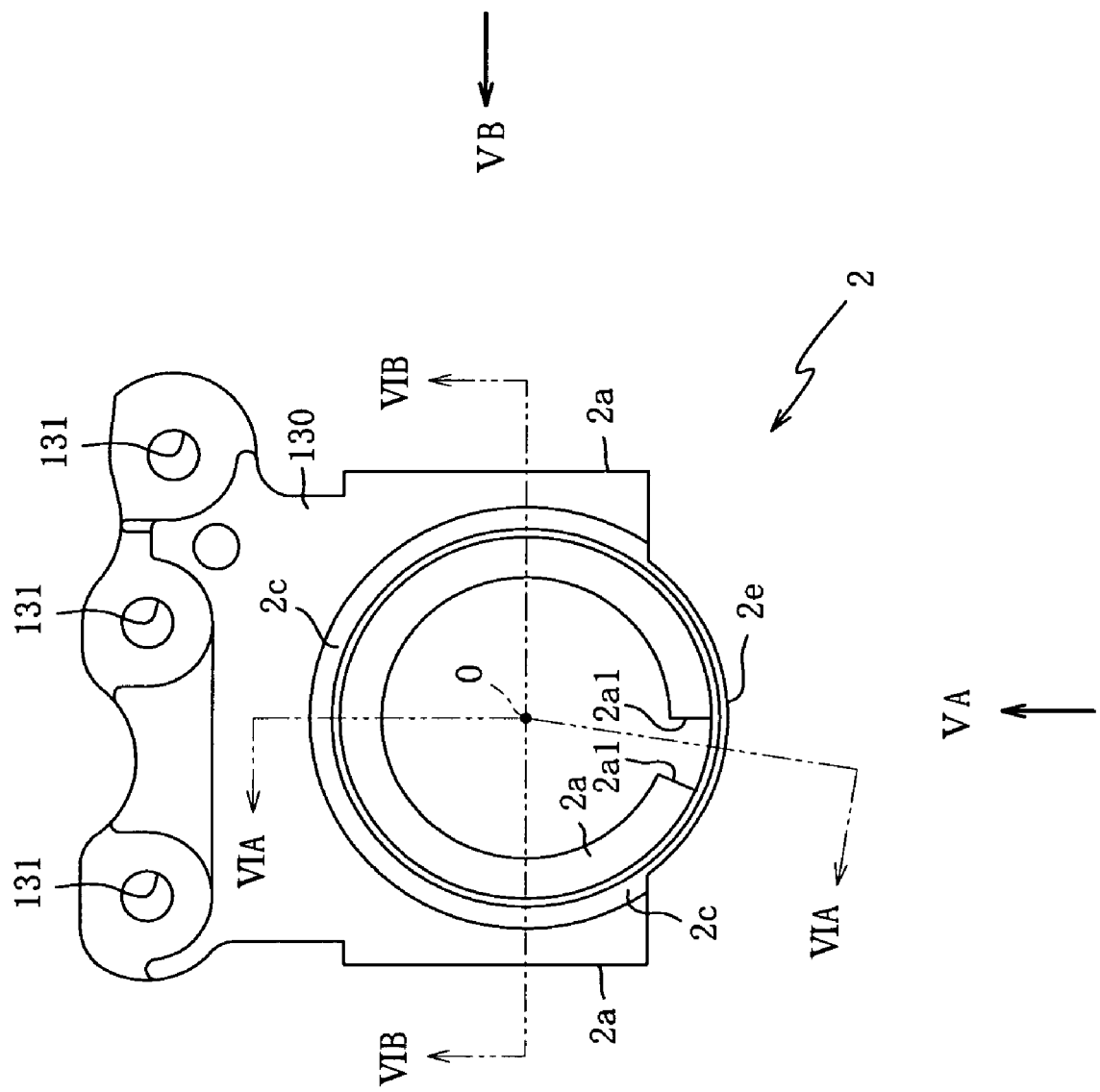
FIG. 4 is a top plan view of a main body member.

The projecting main body portion 2a is formed in a transversely elongated body extending straight in the width direction (the perpendicular direction to the paper face in FIG. 2) of the sidewall parts 123 while facing the sidewall parts 123 of the car body side bracket 120 at a definite distance (cf. FIGS. 4 or 5).

As illustrated in FIG. 2, the vibration-isolating base 3 is formed from a rubber-like elastomer material in the shape of a generally frustum of cone in cross-section symmetric about the central axis O and downwardly converging, and vulcanization bonded between a slanting face of the boss member 1 and a slanting face (the underside) of the receptive surface portion 2b of the main body member 2. The underside of the receptive surface portion 2b is made parallel to the slanting face of the boss member 1 and hence, it is possible to prevent a deformation due to permanent set in fatigue of the vibration-isolating base 3 in comparison with the case where the vibration-isolating base 3 is vulcanization bonded to the inner peripheral surface parallel to the central axis O of the main body member 2.

According to the hydraulic antivibration device 110 in the first embodiment, because of the constitution that the boss member 1 is coupled to the body frame BF side and the main body member 2 is coupled to the engine EG (vibration generator) side, a part of the vibration transmitting path from the partition means 7 to the body frame BF is constructed by the vibration-isolating base 3.

As a consequence, for instance, even if an elastic partition membrane 8 of the partition means 7 impinges on an upper or a lower sandwiching member 9, 10 to oscillate the upper or the lower sandwiching member 9, 10, transmission of the oscillation to the body frame BF can be suppressed reliably by the vibration insulating effect of the vibration-isolating base 3 thus reducing largely the generation of a strange sound.

A first and a second rubber membranes 31, 32 covering the inner peripheral face of the main body member 2 are joined to the vibration-isolating base 3, as shown in FIG. 2. The first rubber membrane 31 are fayed with peripheral marginal portions of upper and lower sandwiching members 9, 10 and the diaphragm 5, which will be later decribed.

Here, on the outer surface of the main body member 2, there is provided the stopper rubber part 33 made of rubber-like elastomer, which is in turn joined through the second rubber portion 32 to the vibration-isolating base 3.

The stopper rubber part 33 serves to abut on the inner face of the car body side bracket 120 (the bottom face part 122, the sidewall parts 123, and the top face part 124) thereby regulating displacement of the engine EG (cf. FIG. 1) thus acting as a stopper member. The stopper rubber part 33 is mainly made up of the rebound side rubber portion 34, the protuberant rubber portion 35, the bound side rubber portion 36, and a transitional rubber portion 37 linking the latter two, all of which are integrally formed.

The rebound side rubber portion 34 and the bound side rubber portion 35 are provided on the upper end face and the lower end face (the upper side face and the lower side face in FIG. 2) of the main body member 2, respectively, which abut on internal faces of the top face part 124 or the bottom face part 122 of the car body side bracket 120 thereby to regulate the displacement of the hydraulic antivibration device 110 (the engine EG) in the rebound direction (the upward direction in FIG. 2) or the bound direction (the downward direction in FIG. 2).

On the other hand, the protuberant rubber portion 35 is provided projectingly to be directed from the outer surface of the main body member 2 toward the sidewall parts 123 of the car body side bracket 120, and serves to abut on the sidewall parts 123 thereby to regulate the displacement of the hydraulic antivibration device 110 (the engine EG) in the roll direction (the arrow mark direction a or the arrow mark direction d in FIG. 2).

Upon abrupt acceleration or deceleration (e.g., upon first speed full gear acceleration) or accidental loading, the transitional rubber portion 37 abuts on the sidewall parts 123 (thick-walled sidewall portions 123b), whereby displacements in the fore and aft direction (the lateral direction in FIG. 2) are regulated.

Here, displacements of the engine EG in the lateral direction (perpendicular direction to the paper face of FIG. 2) are regulated by another vibration isolator supporting the engine EG and consequently, in the hydraulic antivibration device arrangement 100 of this invention it is possible to dispense with any stopper mechanism for regulating displacements in the lateral direction.

The protuberant rubber portion 35 is configured, as illustrated in FIG. 2, in a tapered shape in cross-section narrowing gradually in width toward the car body side bracket 120. Because of that configuration, it is possible to bring it into moderate impingement on the sidewall parts 123, and hence it is possible to suppress the generation of booming noise and to suppress a reaction force to impingement thereby to enhance the durability.

Moreover, the protuberant rubber portion 35 is disposed at a location where it encases the projecting main body portion 2a of the main body member 2, and configured, similarly to the projecting main body portion 2a, in a transversely elongated body which extends straight in the width direction (the perpendicular direction to the paper face of FIG. 2) of the sidewall parts 123 while facing the sidewall parts 123 of the car body side bracket 120 at a definite distance.

The arrow mark direction a shown in FIG. 2 indicates the roll direction upon acceleration while the arrow mark direction d indicates the roll direction upon deceleration. The roll center of the engine EG (cf. FIG. 1) is situated in a lower position (not shown) in FIG. 2. Where the engine EG is displaced in the roll direction, the hydraulic antivibration device 110 is oscillated, at the upper end side of the main body member 2 thereof, like a pendulum relative to the boss member 1 as a stationary point toward the sidewall parts 123 of the car body side bracket 120, namely in the arrow mark direction a or d.

In this invention, the protuberant rubber portion 35 is situated on the upper end side of the main body member 2 (the upper side in FIG. 2) as stated above, and hence it is possible to make the spacing distance from the roll center of the engine EG to the protuberant rubber portion 35 longer by that dimension. The fact that such spacing distance can be lengthened permits to diminish the reaction force to impingement, inasmuch as the roll moment is determined by the product of a distance and a force, and hence it is possible to make input loads to the main body member 2 and the car body side bracket 20 smaller, by that amount.

As a result, it is possible not only to enhance the durability, but also to lower the stiffness and strength required for the members 2, 120, so that it is possible to make these members 2, 120 thin-walled by that decrement, thereby reducing the weight of the hydraulic antivibration device arrangement 100 as a whole.

Further when the reaction force to impingement upon stopper action can be made small as stated above, vibrations input through the car body side bracket 120 to the body frame BF can be suppressed, so that it is possible to reduce the generation of booming noise, by that decrement.

Moreover by making thus the protuberant rubber portion 35 (namely, input position of a load) eccentric on the upper end side of the main body member 2, it is no longer necessary to reinforce the vertical entirety of the main body member 2 as in the conventional products, but it suffices to reinforce the upper end side only by the projecting main body portion 2a. Stated another way, it is possible to make the lower end side of the main body member 2 more thin-walled, so that it is possible to make the overall hydraulic antivibration device arrangement 100 further more lightweight by that amount.

Here, in view of the fact that the input load when regulating displacement in the roll direction is larger on the acceleration side than the deceleration side, the vertical dimensions of the protuberant rubber portion 35 and the projecting main body portion 2a are made larger on the side regulating the roll direction displacements upon acceleration (the left hand in FIG. 2) than the side regulating the roll direction displacements upon deceleration (the right hand in FIG. 2). Thereby enhancement of durability and weight reduction can be simultaneously achieved. These projecting dimensions (the lateral dimension in FIG. 2) are made approximately equal to each other on the acceleration side and the deceleration side.

The diaphragm 5 is configured in the form of a rubber membrane having a partial sphere from a rubber-like elastomer material and attached to the upper end part (the upper side in FIG. 2) of the main body member 2. As a result, the liquid-filled chamber 6 is formed between the lower face side of the diaphragm 5 and the upper face side of the vibration-isolating base 3.

The liquid-filled chamber 6 is sealed with a non-freezing liquid (not shown) such as ethylene glycol. The liquid-filled chamber 6 is, as shown in FIG. 2, comparted by the partition means 7 (the elastic partition membrane 8 and the upper and lower sandwiching members 9, 10) into the first liquid chamber 6A on the vibration-isolating base 3 side (the lower side in FIG. 2) and the second liquid chamber 6B on the diaphragm 5 side (the upper side in FIG. 2).

The diaphragm 5 is vulcanization bonded to an attachment fitting 51 press formed in an annular shape as viewed from the top plane, and attached, as shown in FIG. 2, through the intermediary of the attachment fitting 51 to the upper end part (the upper part in FIG. 2) of the main body member 2.

The partition means 7 is, as described above, to compart the liquid-filled chamber 6 into the first liquid chamber 6A and the second liquid chamber 6B, and mainly made up of the elastic partition membrane 8 configured in a generally disc shape from a rubber-like elastomer material, and the upper and the lower sandwiching members 9, 10 pinching and holding the elastic partition membrane 8 in place in its central axis direction.

As shown in FIG. 2, the partition means 7 (the upper and lower sandwiching members 9, 10) is formed, on its outer periphery side, with the orifice in a generally rectangular shape in cross-section between the inner periphery side (the rubber membrane 31) of the main body member 2 and the outer periphery side. The orifice is a constrictive channel for putting the first liquid chamber 6A and the second liquid chamber 6B into communication with each other.

The orifice is put in communication with the second liquid chamber 6B through a cutout (not shown) defined in the upper sandwiching member 9, and with the first liquid chamber 6A through a cutout formed in the lower sandwiching member 10.

The upper and the lower sandwiching members 9, 10 are pierced with a plurality of openings so that hydraulic pressure fluctuation of the liquid-filled chamber 6 (between the first and the second liquid chambers 6A, 6B) can be transmitted to the elastic partition membrane 8. Thus where a relatively small amplitude vibration is input, the elastic partition membrane 8 displaces by reciprocating to absorb the hydraulic pressure fluctuation between both liquid chambers 6A, 6B, whereby a low dynamic spring characteristic can be obtained.

On the other hand, where a relatively large amplitude vibration is input, for example, owing to the rugged road surface, the upper and the lower sandwiching members 9, 10 regulate the displacement amount of the elastic partition membrane 8 from both sides thereof to elevate the membrane stiffness thereby facilitating the fluidization of fluid through the orifice between both liquid chambers 6A, 6B, whereby a high damping characteristic can be obtained.

Here, the assembling operation of the hydraulic antivibration device 110 is conducted by first fitting the partition means 7 and the diaphragm 5 in this order in the main body member 2 from the opening at the upper end side thereof, and then bending working the one sidewall portion (inner periphery side of the main body member 2) of the groove 2c, which is recessed fully circumferentially at the upper end face of the main body member 2, toward the central axis O side.

As a result, the partition means 7 (the upper and the lower sandwiching members 9, 10) is pinched and fixed between the upside of the receptive surface portion 2b and the diaphragm 5 in the central axis direction (the vertical direction in FIG. 2) of the hydraulic antivibration device 110.

The car body side bracket 120 is a member coupling the hydraulic antivibration device 110 to the body frame BF and serving to receive the rubber stopper member 33 upon stopper action thereof, as stated above, and is configured in the form of a frame consisting of the bottom face part 122, the pair of the sidewall parts 123, and the top face part 124, as shown in FIG. 2.

The bottom face part 122, to which the boss member 1 of the hydraulic antivibration device 110 is locked and fixed, is provided with the through-hole for bolt 122a and the slit portions 122b. The bolt through-hole 122a is constructed to be capable of communicating with the bolt locking hole 11 of the boss member 1, whereas the slit portion 122b is constructed to be capable of communicating with the protruding pin 12 of the boss member 1.

The pair of the sidewall parts 123 are provided vertically from the bottom face part 122, so as to face to each other in a spaced relation of a predetermined distance. Between opposed faces of the pair of sidewall parts 123 there is disposed the hydraulic antivibration device 110. The top face part 124 interconnects upper end portions (the upper side in FIG. 2) of the pair of sidewall parts 123 and is opposed to the bottom face part 122.

Each of the sidewall parts 123 consists of an abutment sidewall portion 123a located on the top face part 124 side and a thick-walled sidewall portion 123b that is located on the bottom face part 122 side and formed in its thickness dimension (the lateral dimension in FIG. 2) to be more thick-walled than the abutment sidewall portion 123a.

The abutment sidewall portion 123a has an abutment face 123a1, on which the protuberant rubber portion 35 is adapted to abut and which is formed to be depressed more than the inner face of the thick-walled sidewall portion 123b toward receding from the outer surface (tip end of the protuberant rubber portion 35) of the main body member 2, as shown in FIG. 2.

By the formation in a depressed manner, the abutment face 123a1 of the abutment sidewall portion 123a can be disposed more distantly from the protuberant rubber portion 35 of the rubber stopper member 33, and consequently, it is possible to ensure the amount of stroke toward the roll direction (the direction a or d) without making the car body side bracket itself large-sized as in the conventional products. Further by that depressed amount, the thick-walled sidewall portion 123b is thus formed to be more thick-walled while making the entirety of the car body side bracket 120 lightweight, whereby it is possible to ensure the stiffness and strength to enhance the durability of the car body side bracket 120 as a whole.

Here, a distance between opposed faces (distance in the lateral direction in FIG. 2) made by the abutment face 123a1 of the abutment sidewall portion 123a and the outer surface of the main body member 2 is made larger (preferably 1.5 times or more, more preferably 2 times or more) on both acceleration side (the left hand in FIG. 2) and deceleration side (the right hand in FIG. 2) than a distance between opposed faces (distance in the lateral direction in FIG. 2) made by the inner face of the thick-walled sidewall portion 123b and the outer surface of the main body member 2.

Thereby it is possible to make the projecting height of the protuberant rubber portion 35 larger thereby to make it easy to exhibit its shock absorbing action. Consequently, upon loading of normal roll motion, the abutment of it against the abutment face 123a1 is rendered moderate and it is possible to avoid the generation of booming noise.

On the other hand, upon abrupt acceleration or deceleration or accidental loading, it is possible to ensure the transitional rubber portion 37 to abut on the thick-walled sidewall portion 123b thereby regulating an excessive displacement of the hydraulic antivibration device 110. Thereby breakage of the vibration-isolating base 3 can be precluded. Also in this case, since the thick-walled sidewall portions 123b are made thicker than the abutment sidewall portions 123a, failure or the like of the sidewall parts 123 can be precluded.

The depressed formation of the abutment face 123a1 like this (rendering the abutment sidewall portions 123a thin-walled) is usually unable for the reason that it is the location where the abutment face 123a1 is subject to input load from the protuberant rubber portion 35. However, this has became possible for the first time by the invention, wherein the car body side bracket 120 is configured in a frame structure consisting of the bottom face part 122, the sidewall parts 123 and the top face part 124 and concurrently, the thick-walled sidewall portions 123b thicker than the abutment sidewall portions 123a are provided and the abutment sidewall portions 123a are disposed at locations surrounded by these thick-walled sidewall portions 123b and the top face part 124. Thereby weight reduction and securement of strength can be attained simultaneously.

Both ends (the lateral ends in FIG. 2) of the bottom face part 122 are formed to extend beyond the sidewall parts 123 as illustrated in FIG. 2, and between the upside of the extended end of the bottom face part 122 and the outer surface of the sidewall part 123, a reinforcing rib part 125 is provided. Thus the stiffness and strength of the car body side bracket 120 as a whole is ensured.

Now referring to FIG. 3 the construction of the car body side bracket 120 will be described in more detail. FIG. 3(a), FIG. 3(b) and FIG. 3(c) are a top plan view, a front elevational view, and a bottom plan view, respectively, of the car body side bracket 120.

Figure 3A:
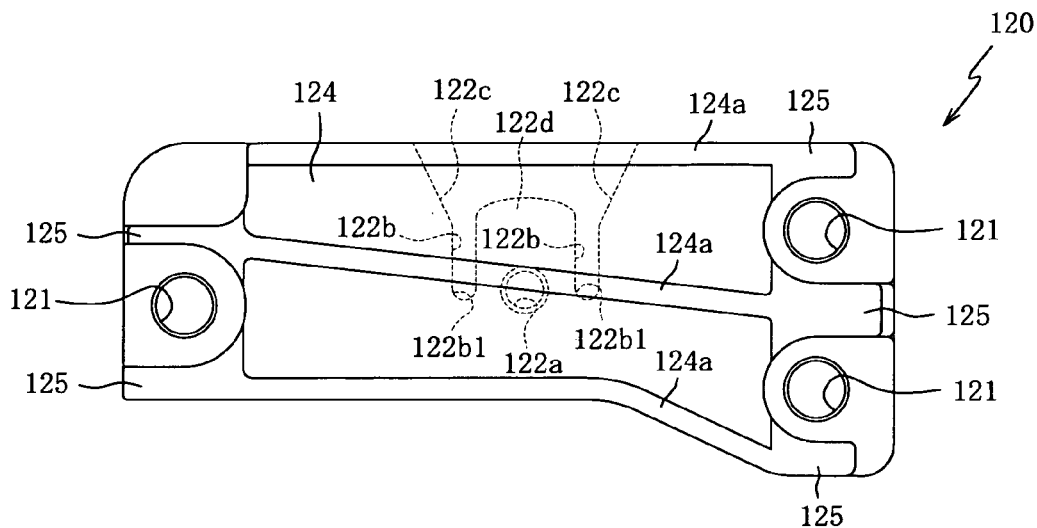
FIG. 3(a) is a top plan view of a car body side bracket, (b) is a front elevation of the car body side bracket, and (c) is a bottom plan view of the car body side bracket.
Figure 3B:
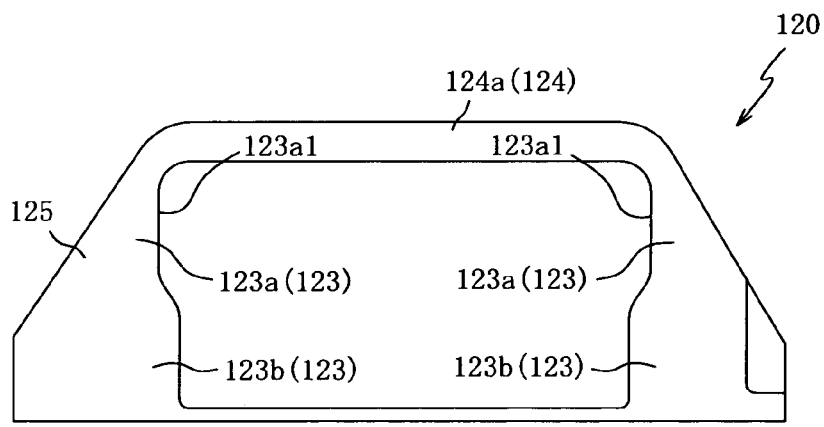

As described above, the car body side bracket 120 is provided with the bottom face part 122, the pair of the sidewall parts 123, and the top face part 124, and configured in a frame shape when viewed from the front side as illustrated in FIG. 3(b). At the upside of the top face part 124, as illustrated in FIG. 3(a), three reinforcing ribs 124a extending in the elongated direction (the lateral direction in FIG. 3(a)) are provided.

Figure 3C:
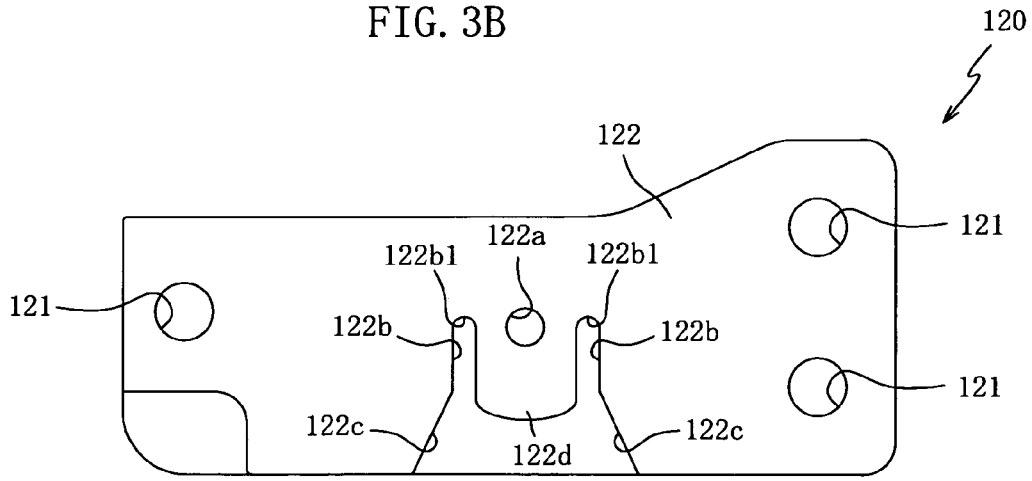

The bottom face part 122 is provided, as illustrated in FIG. 3(c), with the through-hole for bolt 122a, the slit portions 122b, and guiding slope faces 122c. The bolt through-hole 122a is a hole for passage of a bolt (not shown) for locking and fixing the boss member 1 (the bolt locking hole 11) as stated above and configured in a somewhat larger diameter dimension than the bolt locking hole 11 (cf. FIG. 2).

The slit portions 122b are slit-like grooves for receiving therein the protruding pins 12 of the boss member 1 (cf. FIG. 2) as stated above, and provided in two pieces, as shown in FIG. 3(c), so as to extend substantially in parallel to each other in positions interposing the bolt through-hole 122a, having a somewhat larger groove width than the outside diameter of the protruding pin 12.

Each of the slit portions 122b is formed at its extended end with the abutment portion 122b1 in a semicircular form, and constructed so that when two protruding pins 12 are made to abut on both the abutment portions 122b1, the bolt through-hole 122a of the bottom face part 122 and the bolt locking hole 11 of the boss member 1 may be put into communication with each other.

The guiding slope faces 122c are one pair of slope faces for guiding the protruding pins 12 of the boss member 1 into the slit portions 122b, and each join with a leading end of the slit portion 122b, as shown in FIG. 3(c). These paired guiding slope faces 122c are formed to be wider in distance (lateral distance in FIG. 3(c)) between opposed faces thereof on the peripheral end side of the bottom face part 122 (the lower side in FIG. 3(c)) to enhance the guiding operation.

In this invention, the stiffness and strength upon stopper action is ensured by configuring the car body side bracket 120 in a frame shape. However, the configuration of the car body side bracket 120 in a frame shape, on the one hand, causes difficulties in the insertion operation when inserting the hydraulic antivibration device 110 within the frame work (between the opposed faces of the bottom face part 122 and the top face part 124) of the car body side bracket 120 and in the locking operation when locking the bolt into the bolt locking hole 11 of the boss member 1. On the other hand, making the distance between the opposed faces of the bottom face part 122 and the top face part 124 wider gives rise to the problem leading to a large-sized construction and a weight increase of the hydraulic antivibration device arrangement 100 as a whole.

On the contrary, according to the invention, the slit portions 122b are provided at the bottom face part 122 and constructed so as to receive the protruding pins 12 therein, and consequently, it is possible to obtain the effect that the aforementioned distance between the opposed faces can be widened relative to the hydraulic antivibration device 110 by that amount.

As a result, it is possible to conduct easily the insertion operation of inserting the hydraulic antivibration device 110 into the frame of the car body side bracket 120, to enhance the working efficiency. Further it is possible to construct the aforementioned distance between the opposed faces narrower, so that downsizing of the hydraulic antivibration device arrangement 100 as a whole can be achieved.

Further it is readily possible to put the through-hole for bolt 122a of the bottom face part 122 and the bolt locking hole 11 of the boss member 1 into communication with each other by moving the protruding pins 12 up to the abutment portions 122b1 at the terminal ends of the slit portions 122b while guiding the protruding pins 12 by the slit portions 122b. Therefore the bolt can be locked easily through the bolt through-hole 122a to the bolt locking hole 11, so that it is possible to elevate the working efficiency of the locking operation.

Again, because the protruding pins 12 and the slit portions 122b in respective two pieces are formed and constructed so that the bottom face part 122 and the boss member 1 are brought into abutment on each other in two places, reliable positioning of the boss member 1 to the bottom face part 122 can be conducted without relative rotation of the former to the latter. Therefore, by the abutment of the two protruding pins on the abutment portions 122b1 at two locations, it is possible to put the bolt through-hole 122a and the bolt locking hole 11 readily and reliably into communication with each other.

As shown in FIG. 3(c), the two slit portions 122b are provided to extend straightforwardly toward a substantially orthogonal direction to the elongated direction (the lateral direction in FIG. 3) of the bottom face part 122 (namely, in a direction inserting the hydraulic antivibration device 110 within the frame of the car body side bracket 120), and the lengths of both slit portions 122b up to the terminal ends (namely, respective distances along the vertical direction of FIG. 3(c) from the edge ends to the abutment portions 122b1 of the bottom face part 122) are made mutually the same.

Therefore, in inserting the hydraulic antivibration device 110 within the frame of the car body side bracket 120 and putting the bolt locking hole 11 of the boss member 1 into communication with the through-hole for bolt 122a of the bottom face part 122, it will suffice to conduct one time operation of inserting the hydraulic antivibration device 110 straightforwardly unidirectionally without the necessity of conducting any particular positioning in the rotational direction or lateral direction, so that its operation efficiency can be enhanced vastly.

Here, at the bottom face part 122 there is formed a tongue-like piece 122d as a residual portion of the slit portions 122b and the guide slope faces 122c as shown in FIG. 3(c). The tongue-like piece 122d performs the role of a bearing surface (receptive surface) of the boss member 1. By providing the tongue-like piece 122d in this manner, it is possible to ensure its abutment area on the boss member 1, thereby achieving a secure fixing.

As illustrated in FIG. 3(c), the tongue-like piece 122d has its top end side (the lower side in FIG. 3c) cut, with its length in the extended direction (the vertical direction in FIG. 3(c)) being shortened. Thereby while pinching the tongue-like piece 122d between the boss member 1 and the body frame BF, the tip end of the tongue-like piece 122d on which the boss member 1 does not abut, namely a location of it deviating beyond from the peripheral portion of the boss member 1 is suppressed from oscillating, whereby it is possible to avoid generation of a strange noise.

Figure 5B:
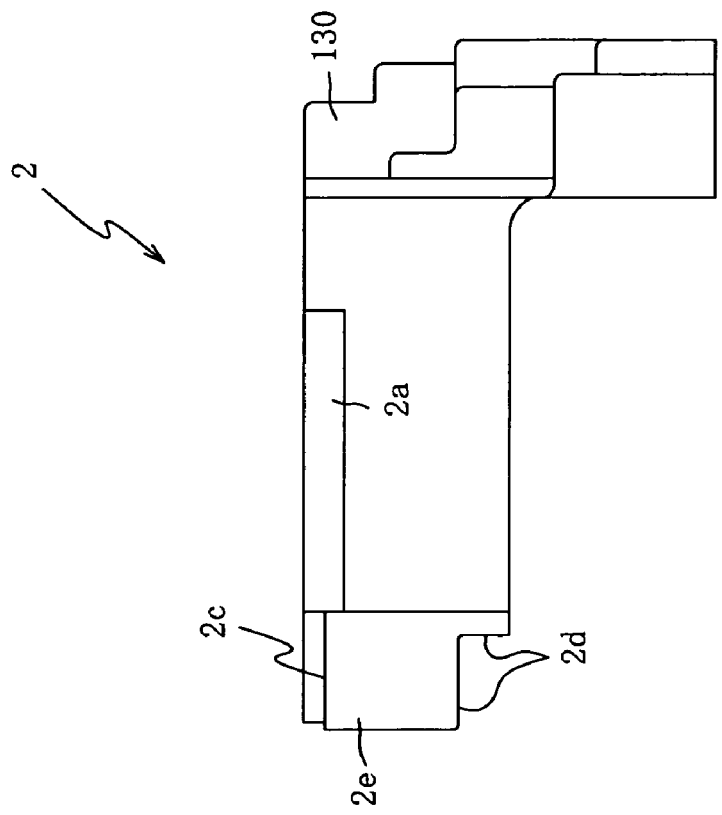
FIG. 5(a) is a front elevational view of the main body member when viewed from the direction of an arrow mark Va in FIG. 4, and (b) is a side elevational view of the main body member when viewed from the direction of an arrow mark Vb in FIG. 4.
Figure 5A:
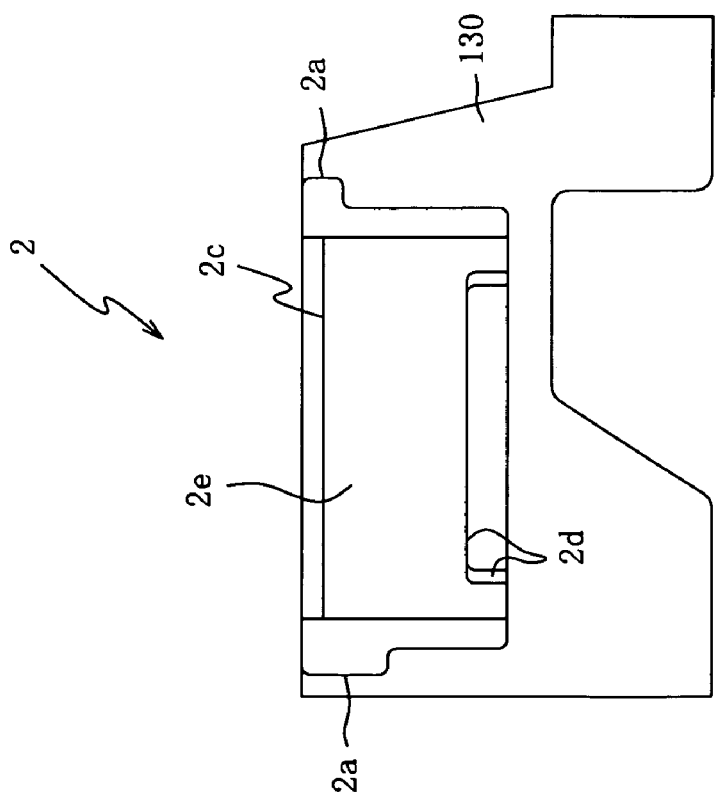
Figure 6A:
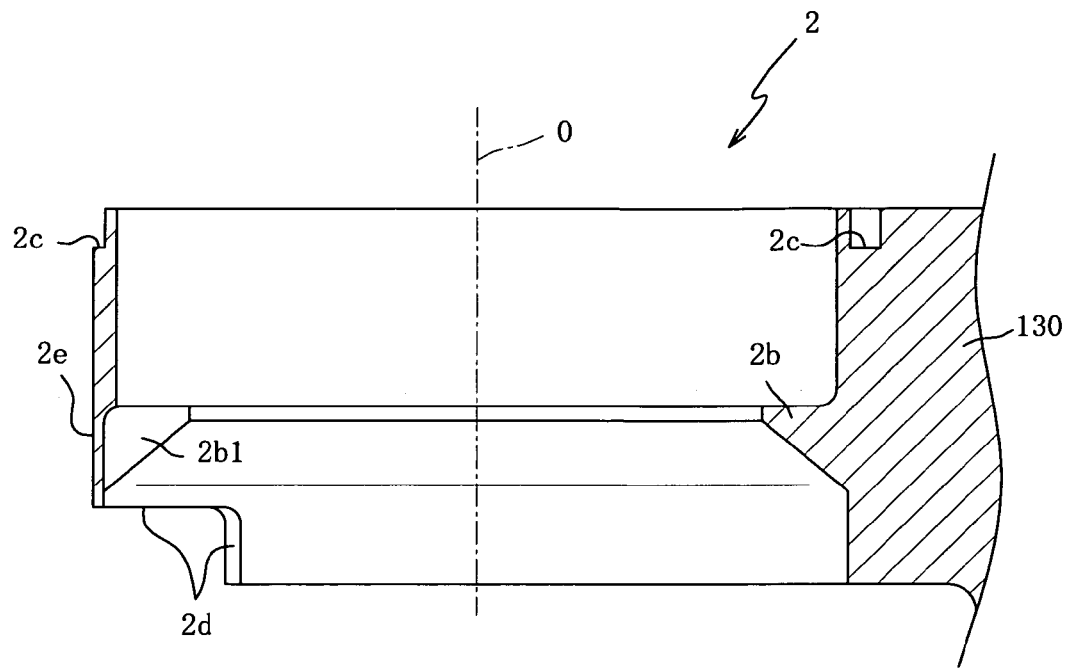
FIG. 6(a) is a sectional view of the main body member taken along VIa-VIa line in FIG. 4, and (b) sectional view of the main body member taken along VIb-VIb line in FIG. 4.
Figure 6B:
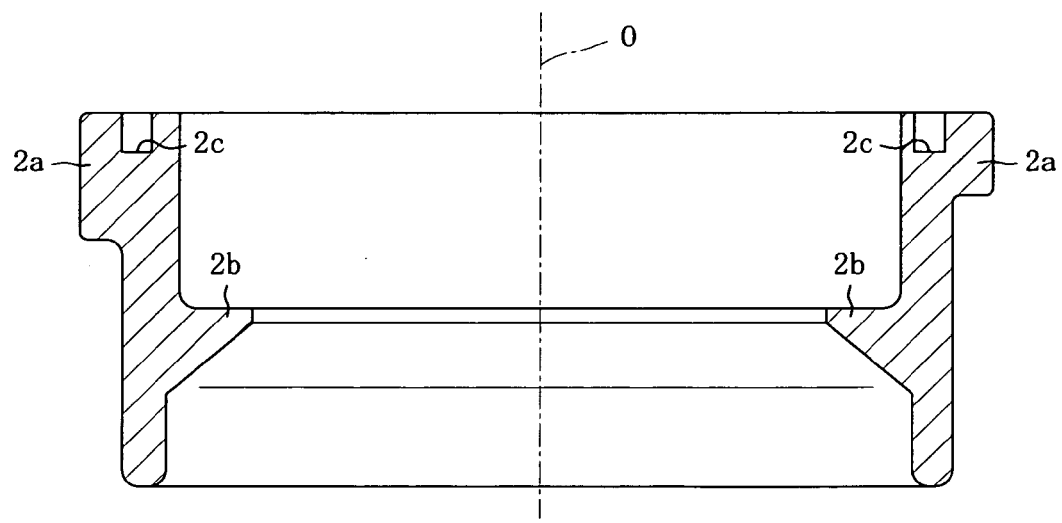

Now details of the main body member 2 will be described with reference to FIGS. 4 through 6. FIG. 4 is a top plan view of the main body member 2. FIG. 5(a) is a top plan view of the main body member 2 when viewed from the arrow direction Va, while FIG. 5(b) is a side elevation of the main body member 2 when viewed from the arrow direction Vb. FIG. 6(a) is a cross-sectional view of the main body member 2 taken along VIa-VIa line in FIG. 4, and FIG. 6(b) is a cross-sectional view of the main body member 2 taken along VIb-VIb line in FIG. 4.

The main body member 2 is, as illustrated in FIGS. 4 or 6, configured in a generally cylinder shape having the central axis O, and on an inner peripheral face thereof, the receptive surface portion 2b in a generally triangular shape in cross-section is formed to overhang toward the central axis direction O. The receptive surface portion 2b is formed, on its circumferentially one part, with a cutout portion 2b1. On the cutout portion 2b1, the cutout portion of the lower sandwiching member 10 is superposed, and the first liquid chamber 6A and the orifice are put in communication with each other (cf. FIG. 2).

From the lower end part of the receptive surface portion 2b (the lower side in FIG. 6), the main body member 2 is further extended downwardly as shown in FIG. 6. At the lower end face of the main body member 2, there is disposed the bound side rubber portion 36 of the rubber stopper member 33 (cf. FIG. 2).

On the upper end face of the main body member 2 as shown in FIGS. 4 or 6 (short of the paper face of FIG. 4), the groove 2c in the form of U shape in cross-section is defined over the whole circumference. As described above, the sidewall portion of the groove 2c on the central axis O side is bent to be urged toward the attachment fitting 51, whereby the diaphragm 5 and the partition means 7 are held in the main body member 2 (cf. FIG. 2).

As illustrated in FIGS. 4 through 6, the engine side bracket 130 is formed integrally with the outer surface of the main body member 2, from which the projecting main body portion 2a is provided projectingly. The engine side bracket 130 is an element linked to the engine EG side (cf. FIG. 1) as stated above, and formed integrally with the outer surface of the main body member 2 in its circumferential area of an angle of ca. 90 degrees.

The projecting main body portion 2a is an element encased within the protuberant rubber portion 35 of the rubber stopper member 33 (cf. FIG. 2) as mentioned above, and one pair of the projecting main body portions are integrally formed with the outer surface of the main body member 2. The pair of the projecting main body portions 2a are disposed on the outer surface of the main body member 2 (the central axis O) to be spaced apart an angle of ca. 180 degrees from each other.

The pair of the projecting main body portions 2a are situated, as shown in FIGS. 5 or 6, at a perpendicularly upper end of the main body member 2 when viewed from a normal direction to the central axis O. Thereby the main body member 2 is constructed in a manner such that the upper end surface thereof is flush with the upper end surfaces of the projecting main body portions 2a, as illustrated in FIG. 4 or FIG. 6(b). Consequently, even though the groove 2c for caulking and fixing is provided on the upper end surface of the main body member 2, the space for disposing the rebound side rubber portion 34 can be sufficiently ensured.

Again the pair of the projecting main body portions 2a are, when viewed from the direction of the central axis O, extended in mutually parallel straight lines. Thereby one pair of the projecting main body portions 2a are, as seen from FIGS. 4 or 5, formed in a transversely elongated body extending straight in the width direction of the sidewall parts 123 (the vertical direction in FIG. 4, the lateral direction in FIG. 5(b)), while being opposed to the sidewall parts 123 of the car body side bracket 120 (cf. FIG. 2) at a definite distance from it.

Thereby it is possible simultaneously to ensure a pressure-receiving area and to ensure a distance spaced apart from the roll center. That is, because due to the formation of a transversely elongated shape, it is possible to widen the pressure-receiving area to obtain a dispersion effect of input load, enhancement of durability and weight reduction can be achieved. On the other hand, the fact that the projecting main body portions 2a (and the protuberant rubber portion 35) are thus formed in the transversely elongated body means that the spacing distance from the roll center of the engine EG can be ensured (cf. FIG. 2), and consequently, as described above, it is possible to make the input loads to the main body member 2 and the car body side bracket 120 small, thereby simultaneously achieving a weight reduction and a reduction of booming noise.

The elongated length (length in the vertical direction in FIG. 4) of the projecting main body portions 2a is made approximately the same as the width (e.g., the breadth in the vertical direction in FIG. 3(a)) of the sidewall parts 123 of the car body side bracket 120.

Here, the main body member 2 is, as illustrated in FIGS. 5 or 6, provided with the cutout portion 2d formed by cutting off a part of the lower end side thereof that is situated on the opposite side (the left hand in FIG. 5(b) and FIG. 6(a)) to the side where the engine side bracket 130 is formed and on the boss member 1 side. Thereby it is possible to make the main body member 2 lightweight, thus to achieve a weight reduction by that amount of the hydraulic antivibration device arrangement 100 as a whole.

The constitution of the invention is such that the main body member 2 supports the engine EG in a cantilever fashion, with the boss member 1 serving as a fixed point (cf. FIGS. 1 and 2). Here in such constitution, if the top end side (the left hand in FIG. 5(b) or FIG. 6(a)) of the main body member 2 located opposite to the coupling part to the engine EG (the attachment holes 131 side) is heavier, the resonance point of the main body member 2 is shifted toward a low frequency range (e.g., 500~600 Hz and its vicinity), which raised the problem that so-called high-speed booming noise is generated.

On the contrary, the position of the cutout portion 2d is situated, interposing the boss member 1, on the opposite side to the engine EG coupling side, namely situated most distantly from the engine EG coupling side, and hence it is possible to make efficiently the top end side of the main body member 2 lightweight. As a consequence, it is possible to efficiently shift the resonance point of the main body member 2 toward a high frequency range, thereby suppressing securely an adverse effect on dynamic characteristics of the hydraulic antivibration device 110.

Further, this invention is constructed so that the groove 2c is provided on the upper end side of the main body member and its sidewall portion is bent up toward the inner periphery side of the main body member 2 thereby to caulk and fix the diaphragm 5 and others. Here, since the position of the cutout portion 2d is situated on the lower end side of the main body member 2, it is possible to avoid a reduction in space for forming the groove 2c by the cutout portion 2d, as a result of which the diaphragm 5 and others can be fixed firmly.

The area in which the cutout portion 2d is formed ranges from the extremity of the main body member 2 (the lower end in FIG. 4, the left end in FIG. 5(b) or FIG. 6(a)) to a predetermined position, namely is limited to the area where it does not abut on the bottom face part 122 of the car body side bracket 120. Therefore even though the bound side rubber portion 36 is constructed on the lower end side of the main body member 2 so as to be capable of exhibiting a stopper action of the bound side, it is possible to ensure the area receiving the reaction force to impingement upon stopper action to achieve a weight reduction, while suppressing a reduction in durability of the main body member 2 to the minimum degree.

Again, the main body member 2 is, as shown in FIG. 6(a), provided with the thin-walled portion 2e formed by recessing the outer surface of the opposite side (the left hand in FIG. 5(b) and FIG. 6(a)) to the side thereof where the engine side bracket 130 is provided. Thereby the main body member 2 is made lightweight, by which amount it is possible to reduce the weight of the hydraulic antivibration device arrangement 100 as a whole. The area in which the thin-walled portion 2e is formed ranges from the top end of the main body member 2 (the lower end in FIG. 4, the left end in FIG. 5(b) or FIG. 6(a)) to the positions where the projecting main body portions 2a are formed.

Here, the location where the thin-walled portion 2e is formed is situated, interposing the boss member 1, on the opposite side to the engine EG coupling side, as is the case with the cutout portion 2d above, namely situated most distantly from the engine coupling side. As a consequence, it is possible to reduce the weight of the top end side of the main body member 2 so efficiently that it is possible to shift efficiently the resonance point of the main body member 2 to a high frequency range, thereby suppressing securely an adverse effect on the dynamic characteristics of the hydraulic antivibration device 110.

In this invention, the rubber membrane 31 is formed on the inner periphery side of the main body member 2, and the partition means 7 and the diaphragm 5 are inserted while faying with the rubber membrane 31. At that time, since the thin-walled portion 2e is situated on the outer surface of the main body member 2, by the formation of the thin-walled portion 2e at a part of the inner periphery of the main body member, it is possible to preclude the thickness of the rubber membrane 31 from being uneven in the circumferential direction. As a result, the outer peripheral portions of the partition means 7 and the diaphragm 5 can be fayed evenly with the rubber membrane over the full periphery and hence it is possible to prevent the leak of liquid to suppress a reduction in dynamic characteristics.

Now with reference to FIGS. 7 and 8, a second embodiment of the invention will be described. The same parts as those in the first embodiment are designated by like reference characters, and description of them will be omitted.

Figure 7:
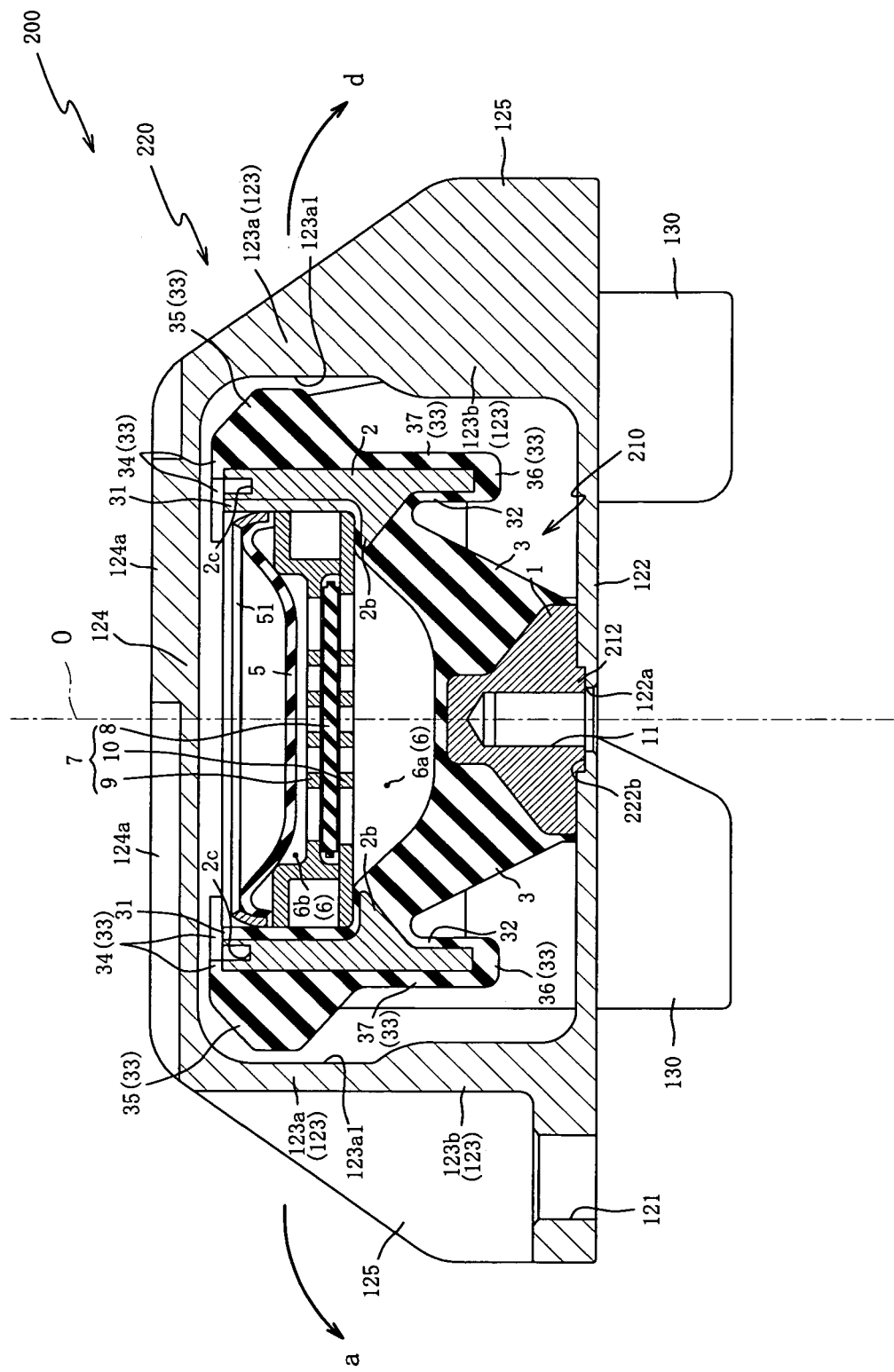
FIG. 7 is a cross-sectional view of the hydraulic antivibration device arrangement in a second embodiment.

FIG. 7 is a cross-sectional view of the hydraulic antivibration device arrangement 200 in the second embodiment. In the first embodiment described so far, description has been made of the case where the main body member 2 of the hydraulic antivibration device 110 is provided with the projecting main body portions 2a (cf. FIG. 2), but the hydraulic antivibration device 210 in the second embodiment is, as illustrated in FIG. 7, devoid of the projecting main body portions 2a. Instead, the sidewall part of the main body member 2 is constructed to be vertically straight. Thereby it is possible to achieve a weight reduction of the main body member 2.

The omission of such projecting main body portion 2a is usually unable, inasmuch as the location receives an input load through the protuberant rubber portion 35, but becomes possible for the first time in this invention by making the protuberant rubber portion 35 eccentric toward the upper end side (the upper side in FIG. 7) of the main body member 2 thereby reducing an impingement reaction force upon stopper action. Because of that it is possible to achieve simultaneously weight reduction and securement of strength.

Further in the first embodiment described above, the bottom face part 122 of the car body side bracket 120 is cut out to form the slit portions 122b (cf. FIG. 3), whereas in the second embodiment, the bottom face part 122 of the car body side bracket 220 is recessed on its one face side to form the slit portion 222b (cf. FIG. 7). Stated another way, the slit portion 222 is formed as a slot or recessed groove.

Figure 8A:
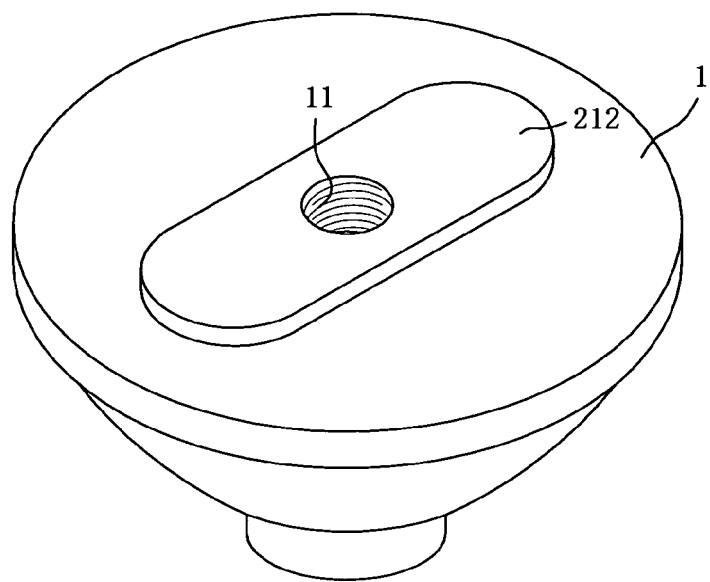
FIG. 8(a) is a perspective view of a boss member, and (b) is a perspective view of a bottom face part.

Here, the detailed constructions of the slit portion 222b and the protruding pin 212 will be described with reference to FIG. 8. FIG. 8(a) is a perspective view of the boss member 1, and FIG. 8(b) is a perspective view of the bottom face part 122.

One piece of the protruding pin 212 in the second embodiment is provided from the boss member 1 as illustrated in FIG. 8(a), and configured in an elongated hole shape having linear lines mutually parallel with both lateral faces, as viewed in the front elevation.

Figure 8B:
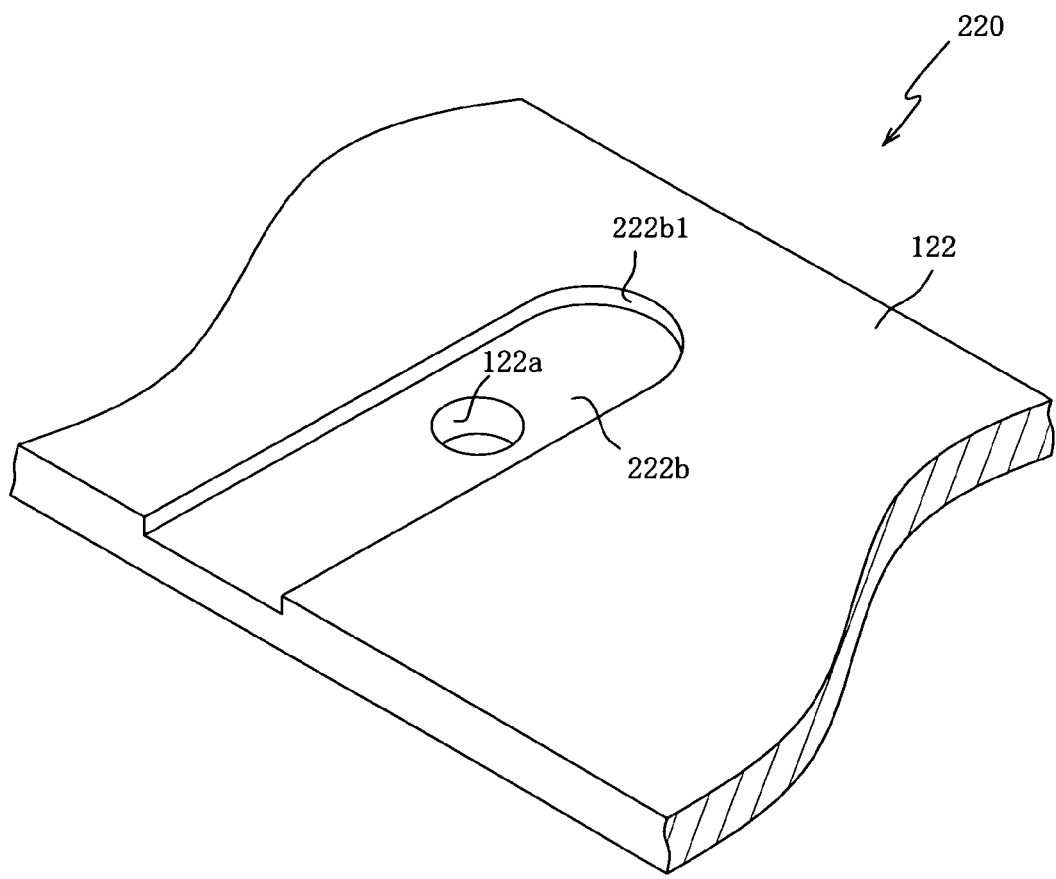

On the other hand, the slit portion 222b is, as shown in FIG. 8(b), formed as a recessed groove or slot, which is extended rectilinearly from a marginal edge portion of the bottom face part 122. The width of the slit portion 222b is formed to be the same as or somewhat larger than the width dimension of the protruding pin 212. The depth of the slit portion 222b is made shallower than the height of the protruding pin 212, but the depth may be made deeper than the height.

The slit portion 222b is formed, at its terminal end in the extended direction, with the abutment portion 222b1 in a semicircular shape, as illustrated in FIG. 8(b), and constructed so that the bolt through-hole 122a of the bottom face part 122 and the bolt locking hole 11 of the boss member 1 may be put into communication with each other when the end of the protruding pin 212 is brought in abutment on the abutment portion 222b1.

As a consequence, downsizing of the car body side bracket 220 can be achieved as is the case with the first embodiment above. Simultaneously, since the locking bolt can be locked easily via the bolt through-hole 122a to the bolt locking hole 11 by making the end of the protruding pin 212 to abut on the abutment portion 122b1 while guiding the protruding pin 212 by the slit portion 222b, the working efficiency of such locking operation can be enhanced.

Further the protruding pin 212 is configured in an elongated hole shape when viewed from the front elevation and the slit portion 222b is extended rectilinearly, and hence, it is possible to conduct a reliable positioning of the boss member 1 relative to the bottom face part 122 without relative rotation without the necessity of forming respective two pieces of the protruding pins 12 and the slit portions 122b as in the first embodiment. Further because the slit portion 222b is formed as a slot, it is possible to prevent a reduction in strength of the bottom face part 122 as compared with the first embodiment wherein the bottom face part is cut out.

The present invention has been so far described on the basis of the specific embodiments, but this invention is by no means limited to them, and it will be appreciated that various modifications and variations can be made within the purview not departing from the spirit or purport of the invention.

In the embodiments above, the description has been made of the cases where the slit portion 122b or 222b is provided on the bottom face part 122 of the car body side bracket 120 or 220 and the protruding pin 12 or 212 is provided on the boss member 1 of the hydraulic antivibration device 110 or 210, but should not always be construed to be limited to them. For instance, it is naturally possible to provide the bottom face part 122 with the protruding pin while to provide the boss member 1 with the slit portion (slot) receiving the protruding pin.

In the embodiments above, the cases where respective one or two pieces of the slit portion 122b or 222b and the protruding pin 12 or 212 are provided have been described, but the number of them is not limited to this, and it is naturally possible to provide another pieces of them. For example, three pieces or more is possible.

Again in the first embodiment above, the description has been made of the case where the projecting main body portion 2a is configured in a transversely elongated shape such that extends straight in the width direction (the lateral direction in FIG. 5b) of the sidewall part 123 while facing the sidewall part 123 of the car body side bracket 120 at a definite distance.

Here, it is preferred that the transversal width dimension (the lateral direction dimension in FIG. 5b) of the projecting main body portion 2a be equal to the width dimension (the perpendicular dimension to the paper face in FIG. 3b) of the sidewall part 123 of the car body side bracket 120. This is because if the transversal width dimension is small, the pressure receiving area to the reaction force to impingement cannot be ensured, resulting in a reduction in durability, whereas if the transversal width dimension is large, a weight increase is resulted.

The invention claimed is:

1. A hydraulic antivibration device arrangement comprising:
   a hydraulic antivibration device which comprises a cylindrical main body member, a boss member situated on a lower end face side of the main body member, a vibration-isolating base made of rubber-like elastomer material connecting the boss member and the main body member, a diaphragm attached to the main body member to define a liquid-filled chamber between the diaphragm and the vibration-isolating base, partition means comparting the liquid-filled chamber into a first liquid chamber on the vibration-isolating base side and a second liquid chamber on the diaphragm side, an orifice putting the first liquid chamber and the second liquid chamber into communication with each other, and a rubber stopper member made of rubber-like elastomer material provided on an outer surface of the main body member;
   vibration source side bracket formed integrally with the main body member of the hydraulic antivibration device and to be coupled to a vibration source side; and
   a body side bracket which includes a bottom face part to which the boss member of the hydraulic antivibration device is locked and fixed, a pair of sidewall parts provided perpendicularly from the bottom face part and opposed to each other, interposing the hydraulic antivibration device therebetween, and a top face part interconnecting the pair of the sidewall parts and opposed to the bottom face part, interposing the hydraulic antivibration device between the bottom face part and the top face part, and is adapted to be connected to a body frame side;
   wherein said hydraulic antivibration device is constructed to support the vibration source in a suspending manner and to be capable of bringing the rubber stopper member provided on the outer surface of the main body member into abutment on internal faces of the sidewall parts of the body side bracket, thereby regulating displacement of the vibration source in a roll motion direction at least upon acceleration,
   wherein the rubber stopper member is provided with a protuberant rubber portion protruding from the outer surface of the main body member toward the sidewall parts of the body side bracket and tapering in cross-section,
   wherein the protuberant rubber portion is situated at least on an upper end side above a vertically intermediate position of the main body member and configured in a transversely elongated body extending straight widthwise toward the sidewall parts of the body side bracket while facing the sidewall parts in a spaced relationship of a definite distance;
   wherein the sidewall parts of the body side bracket each include an abutment sidewall portion having an abutment face on which the protuberant rubber portion of the rubber stopper member abuts and a thick-walled sidewall portion formed to be more thick-walled than the abutment sidewall portion, and
   wherein the abutment face of the abutment sidewall portion is formed to be depressed from the inner face of the thick-walled sidewall portion.

2. The hydraulic antivibration device arrangement as claimed in claim 1,
   wherein the main body member is provided with a projecting main body portion projecting from the outer surface of the main body member toward the sidewall parts of the body side bracket, and
   wherein the projecting main body portion is situated on the upper end side above the vertically intermediate position of the main body member and configured in the transversely elongated body extending straight widthwise toward the sidewall parts, while facing the sidewall parts of the body side bracket at a definite distance and encased in the protuberant rubber portion of the rubber stopper member.

3. The hydraulic antivibration device arrangement as claimed in claim 1 or 2,
   wherein the main body member is provided with a cutout portion defined by cutting a part of an underside thereof situated on the opposite side to the vibration source side bracket and on the boss member side.

4. The hydraulic antivibration device arrangement as claimed in claim 1 or 2,
   wherein the main body member is provided with a thin-walled portion formed by depressing the outer surface thereof opposite to the vibration source side bracket.

5. The hydraulic antivibration device arrangement as claimed in claim 1 or 2, further comprising:
   a protruding pin provided to project from one of the bottom face part of the body side bracket and the boss member1 and a slit portion serving as a guide path for the protruding pin and provided to extend at the other of the bottom face part of the body side bracket and the boss member, slit portion having an abutment portion provided at its extended extremity;
   wherein the bottom face part of the body side bracket has a through-hole for a bolt and the boss member has a locking hole for the bolt so that when the protruding pin is made to abut on the abutment portion of the slit portion, the through-hole and the locking hole for the bolt may be put in communication with each other.

6. The hydraulic antivibration device arrangement as claimed in claim 5,
   wherein two pieces of the protruding pins are provided projectingly at one of the bottom face part of the body side bracket and the boss member, and two pieces of the slit portions are provided to extend at the other of the bottom face part of the body side bracket and the boss member; and
   wherein the two protruding pins and the two slit portions are constructed so that when the two protruding pins are made to abut on the abutment portions of the two slit portions respectively, the through-hole and the locking hole for the bolt may be put into communication with each other.

7. The hydraulic antivibration device arrangement as claimed in claim 1 or 2,
wherein the rubber stopper member includes a rebound side rubber portion and a bound side rubber portion provided respectively on an upper end surface and a lower end surface of the main body member; and
wherein rebound side rubber portion and the bound side rubber portion are constructed so as to be capable of regulating the displacement in a rebound direction and a bound direction of the hydraulic antivibration device by abutment of them on the top face part and the bottom face part of the body side bracket, respectively.

8. The hydraulic antivibration device arrangement as claimed in claim 7,
wherein the projecting main body portion of the main body member projecting from the outer surface thereof is situated on an uppermost end side of the main body member and constructed so that upper end surfaces of the projecting main body portion and the main body member are flush with each other.

* * * * *